United States Patent [19]
Moriyama et al.

[11] 3,817,984
[45] June 18, 1974

[54] PROCESS FOR PRODUCING BENZODIAZEPINE DERIVATIVES

[75] Inventors: Hiroaki Moriyama; Hisao Yamamoto, both of Nishinomiya; Shigeho Inaba, Takarazuka; Hideo Nagata, Ibaragi, all of Japan

[73] Assignee: Sumitomo Chemical Company Ltd., Osaka, Japan

[22] Filed: Feb. 28, 1972

[21] Appl. No.: 230,157

Related U.S. Application Data
[63] Continuation of Ser. No. 840,064, July 8, 1969, abandoned.

[52] U.S. Cl..... 260/239 BD, 260/566 R, 260/566 D
[51] Int. Cl............................................ C07d 53/06
[58] Field of Search................ 260/239 BD, 239 CA

[56] References Cited
UNITED STATES PATENTS
3,131,178  4/1964  Archer et al. ................. 260/239 BD
3,553,199  1/1971  Archer et al. ................. 260/239 BD OTHER PUBLICATIONS
Smith, Open–Chain Nitrogen Compounds, Vol. 1, (W. A. Benjamin, Inc., New York, 1965), page 301. QD412N156.
Wagner et al., Synthetic Organic Chemistry, (New York, 1953), pages 666–670. QD262W24.

*Primary Examiner*—Alton D. Rollins
*Attorney, Agent, or Firm*—Stevens, Davis, Miller & Mosher

[57] ABSTRACT

Novel process for producing 2,3-dihydro-lH-1,4-benzodiazepine derivatives. 2,3-Dihydro-1H-1,4-benzodiazepine derivatives of the formula,

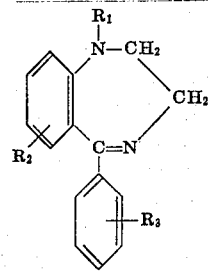

wherein $R_1$ is a hydrogen atom, a lower alkyl group or a cycloalkylmethyl group; $R_2$ is a hydrogen atom, a halogen atom, a nitro group, a lower alkoxy group or a trifluoromethyl group; and $R_3$ is a hydrogen atom, a halogen atom, a lower alkyl group, a lower alkoxy group or a trifluoromethyl group, are produced by reacting a diphenylmethyleneimine derivative of the formula,

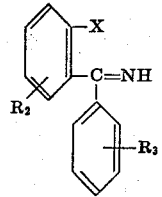

Wherein $R_2$ and $R_3$ are as defined above; and X is a halogen atom, with an ethylenediamine derivative of the formula, $$R_1 - NH - CH_2 - CH_2 - NH_2$$

wherein $R_1$ is as defined above, preferably in the presence of a catalyst such as copper acetate and an acid binding agent such as anhydrous potassium carbonate, anhydrous sodium acetate, pyridine or N-ethylmorpholine.

11 Claims, No Drawings

PROCESS FOR PRODUCING BENZODIAZEPINE DERIVATIVES

This is a continuation of application Ser. No. 840,064 filed July 8, 1969, and now abandoned.

This invention relates to a novel process for producing 2,3-dihydro-1H-1,4-benzodiazepine derivatives. More particularly, the invention pertains to a novel process for preparing 2,3-dihydro-1H-1,4-benzodiazepine derivatives, and salts thereof, represented by the formula,

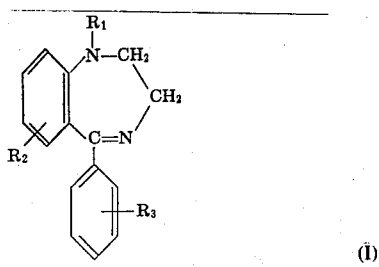

(I)

wherein $R_1$ signifies a hydrogen atom, a lower alkyl group having up to 4 carbon atoms or a cycloalkyl-methyl group having up to 4 – 7 carbon atoms; $R_2$ signifies a hydrogen atom, a halogen atom, a nitro group, a lower alkoxy group having up to 4 carbon atoms or a trifluoromethyl group; and $R_3$ signifies a hydrogen atom, a halogen atom, a lower alkyl group having up to 4 carbon atoms, a lower alkoxy group having up to 4 carbon atoms or a trifluoromethyl group.

In the compounds represented by the aforesaid formula (I), the halogen atom includes chlorine, bromine, iodine and fluorine atoms; the alkyl group includes straight or branched-chain alkyl group, for example, methyl, ethyl, n-propyl, isopropyl, n-butyl, isobutyl and tertiary butyl groups; and the lower alkoxy group includes, for example, methoxy, ethoxy, n-propoxy, isopropoxy, n-butoxy and tertiary butoxy groups.

The present invention is concerned with a process for producing 2,3-dihydro-1H-1,4-benzodiazepine derivatives, and salts thereof, represented by the aforesaid formula (I) by treating a diphenylmethyleneimine derivative represented by the formula,

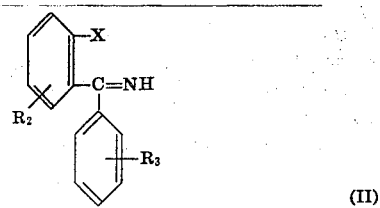

(II)

Wherein $R_2$ and $R_3$ are as defined above in the formula (I), and X signifies a halogen atom, with an ethylenediamine derivative represented by the formula, $R_1 - NH - CH_2 - CH_2 - NH_2$   (III)

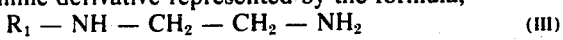

Wherein $R_1$ is as defined above.

The 2,3-dihydro-1H-1,4-benzodiazepine derivative represented by the formula (I) have prominent effects as tranquilizers, musculerelaxants, antispasmodics and hypnotics, and are of great importance as medicines.

A few processes for producing these benzodiazepine derivatives have heretofore been described. For instance, it is known to obtain the 2,3-dihydro-1H-1,4-benzodiazepine derivatives by treating a corresponding 1-unsubstituted benzodiazepin-2-one derivative with lithium aluminium hydride and, further, if desired, alkylating the resulting compound, or converting an o-aminobenzophenone derivative into a benzamidoethylamino or phthalimidoethylamino derivative, followed by hydrolysis to remove the protecting acyl group. [L. H. Sternbach et al : J. Crg. Chem. 28 2456 (1963)].

Contrary to these procedures, we have found, unexpectedly, that 2,3-dihydro-1H-1,4-benzodiazepine derivatives of the formula (I) can be smoothly and economically prepared in good yield and of high purity by treating a diphenylmethyleneimine derivative of the formula (II) with an ethylenediamine derivative of the formula (III). This new and useful process differs from the known methods and represents an improvement thereover.

The diphenylmethyleneimine derivatives of the formula (II) which are employed as starting materials in the present invention, are easily prepared, for example, by treating O-halogenobenzonitrile with a Grignard reagent, namely, phenylmagnesium bromide derivative and treating the resulting Grignard adduct with anhydrous methanol a saturated aqueous ammonium chloride solution.

In preparing the 2,3-dihydro-1H-1,4-benzodiazepine derivatives of the formula (I), diphenylmethyleneimine derivatives of the formula (II) are treated with an ethylenediamine derivative in the presence of an acid binding agent such as alkalimetalhydroxide, alkalimetalcarbonate or tertiaryamine, for example, anhydrous potassium carbonate, anhydrous sodium acetate, pyridine, N-ethyl-morpholine or the like. Optionally, the reaction can be accelerated by further adding of a catalyst such as copper powder, copper salts (e.g., copper acetate) or the like. The reaction is preferably carried out in a suitable solvent. The suitable solvent includes nitrobenzene, dimethyl-formamide, dimethylsulfoxide, pyridine, picoline and quinoline. The reaction is generally effected at a temperature within the range from room temperature to the boiling point of the solvent employed.

The 2,3-dihydro-1H-1,4-benzodiazepine derivatives obtained according to the above-mentioned process may also be isolated in the form of acid addition salts on treatment with an acid, e.g., a mineral acid such as hydrochloric, sulfuric or phosphoric acid, or an organic acid such as maleic, fumaric, succinic or acetic acid.

According to the process of the present invention, there are produced such 2,3-dihydro-1H-1,4-benzodiazepine derivatives and acid addition salts thereof as shown below.

5-Phenyl-2,3-dihydro-1H-1,4-benzodiazepine
5-Phenyl-7-chloro-2,3-dihydro-1H-1,4-benzodiazepine
5-Phenyl-7-nitro-2,3-dihydro-1H-1,4-benzodiazepine
5-Phenyl-7-trifluoromethyl-2,3-dihydro-1H-1,4-benzodiazepine
5-Phenyl-7-methoxy-2,3-dihydro-1H-1,4-benzodiazepine
5-(o-chlorophenyl)-7-chloro-2,3-dihydro-1H-1,4-benzodiazepine
5-(o-fluorophenyl)-7-chloro-2,3-dihydro-1H-1,4-benzodiazepine
5-(p-chlorophenyl)-7-chloro-2,3-dihydro-1H-1,4-benzodiazepine 5-(p-tolyl)-7-chloro-2,3-dihydro-1H-1,4-benzodiazepine 5-(p-tolyl)-7-nitro-2,3-dihydro-1H-1,4-benzodiazepine 5-(p-methoxyphenyl)-7-chloro-2,3-dihydro-1H-1,4-benzodiazepine 5-(o-trifluoromethyl)-7-trifluoromethyl-2,3-dihydro-1H-1,4-benzodiazepine 1-Methyl-5-phenyl-7-chloro-2,3-dihydro-1H-1,4-benzodiazepine 1-Methyl-5-phenyl-2,3-dihydro-1H-1,4-benzodiazepine 1-Methyl-5-phenyl-7-nitro-2,3-dihydro-1H-1,4-benzodiazepine 1-Methyl-5-phenyl-7-trifluoromethyl-2,3-dihydro-1H-1,4-benzodiazepine 1-Methyl-5-(o-fluorophenyl)-7-chloro-2,3-dihydro-1H-1,4-benzodiazepine 1-Methyl-5-(o-tolyl)-7-chloro-2,3-dihydro-1H-1,4-benzodiazepine 1-Ethyl-5-phenyl-7-chloro-2,3-dihydro-1H-1,4-benzodiazepine 1-Cyclopropylmethyl-5-phenyl-7-chloro-2,3-dihydro-1H-1,4-benzodiazepine 1-Cyclopropylmethyl-5-phenyl-7-trifluoromethyl-2,3-dihydro-1H-1,4-benzodiazepine 1-Cyclobutylmethyl-5-phenyl-7-chloro-2,3-dihydro-1H-1,4-benzodiazepine 1-Cyclopentylmethyl-5-phenyl-7-chloro-2,3-dihydro-1H-1,4-benzodiazepine This invention is further disclosed in the following Examples of preferred embodiments thereof, which are presented for purposes of illustration and are not intended to limit the scope of the invention.

EXAMPLE 1

To a solution of 3.1 g of 1-phenyl-1-(2'-chlorophenyl)methyleneimine in 30 ml of nitrobenzene are added 4.5 g of ethylenediamine 0.5 g of anhydrous copper acetate and 4 g of anhydrous potassium carbonate and the mixture is heated under reflux for 15 hours. The reaction mixture is diluted with 50 ml of water and the nitrobenzene is removed by steam distillation. The residue is extracted with 1N aqueous hydrochloric acid, basified with aqueous sodium hydroxide solution, and extracted with ether. The ethereal solution is dried over anhydrous sodium sulfate and evaporated to a syrupy residue which slowly solidified. Recrystallization from ethanol gives 5-phenyl-2,3-dihydro-1H-1,4-benzodiazepine as needles, m.p. 143° – 145°C.

Similarly, using the procedure in Example 1, but replacing 1-phenyl-1-(2'-chlorophenyl)methyleneimine by 1-phenyl-1-(2',5'-dichlorophenyl)methyleneimine, there is obtained 5-phenyl-7-chloro-2,3-dihydro-1H-1,4-benzodiazepine as yellow needles, m.p. 172° – 174°C.

Similarly, using the procedure in Example 1, but replacing 1-phenyl-1-(2'-chlorophenyl)methyleneimine by 1-phenyl-1-(2'-chloro-5'-nitrophenyl)methyleneimine, there is obtained 5-phenyl-7-nitro-2,3-dihydro-1H-1,4-benzodiazepine as yellow needles, m.p. 211° – 212°C.

Similarly, using the procedure in Example 1, but replacing 1-phenyl-1-(2'-chlorophenyl)methyleneimine by 1-phenyl-1-(2'-chloro-5'-trifluoromethylphenyl)-methyleneimine, there is obtained 5-phenyl-7-trifluoromethyl-2,3-dihydro-1H-1,4-benzodiazepine as yellow needles, m.p. 116° – 118°C.

EXAMPLE 2

To a solution of 3.1 g of 1-phenyl-1-(2'-chlorophenyl)methyleneimine in 30 ml. of nitrobenzene are added 1.2 g of N-methylethylenediamine, 0.5 g of anhydrous copper acetate and 4 g of anhydrous potassium carbonate. The mixture is heated under reflux overnight. After cooling, the reaction mixture is diluted with 50 ml. of water and the nitrobenzene is removed by steam distillation. The residue is extracted with 2 N aqueous hydrochloric acid, washed with ether, basified with aqueous sodium hydroxide and extracted with ether. The ethereal layer is washed with water and dried over anhydrous sodium sulfate, and the solvent is removed under reduced pressure. The residue is crystallized from hexane to give 1-methyl-5-phenyl-2,3-dihydro-1H-1,4-benzodiazepine, m.p. 111° – 113°C.

Similarly, using the procedure in Example 2, but replacing 1-phenyl-1-(2'-chlorophenyl)methyleneimine by 1-phenyl-1-(2'-chloro-5'-trifluoromethyl-phenyl)methylene-imine, there is obtained 1-methyl-5-phenyl-7-trifluoromethyl-2,3-dihydro-1H-1,4-benzodiazepine, which is recrystallized from benzene-hexane and then from hexane to give yellow prisms, m.p. 151° – 152°C.

Similarly, using the procedure in Example 2, but replacing 1-phenyl-1-(2'-chlorophenyl)methyleneimine by 1-phenyl-1-(2',5'-dichlorophenyl)methyleneimine, there is obtained 1-methyl-5-phenyl-7-chloro-2,3-dihydro-1H-1,4-benzodiazepine hydrochloride, which is recrystallized from isopropylalcohol, m.p. 251° – 253°C. (decomp.).

Similarly, using the procedure in Example 2, but replacing 1-phenyl-1-(2'-chlorophenyl)methyleneimine and N-methylethylenediamine by 1-phenyl-1-(2'-chloro-5'-trifluoromethyl-phenyl)methyleneimine and N-cyclopropyl-methylethylenediamine respectively, there is obtained 1-cyclopropylmethyl-5-phenyl-7-trifluoromethyl-2,3-dihydro-1H-1,4-benzodiazepine hydrochloride, m.p. 243° – 245°C. (decomp.).

Similarly, using the procedure in Example 2, but replacing 1-phenyl-1-(2'-chlorophenyl)methyleneimine and N-methylethylenediamine by 1-phenyl-1-(2',5'-dichloro-phenyl)methyleneimine and N-cyclopropylmethyl-ethylene-diamine respectively, there is obtained 1-cyclopropylmethyl-5-phenyl-7-chloro-2,3-dihydro-1H-1,4-benzodiazepine hydrochloride, m.p. 221° – 223°C. (decomp.).

What is claimed is:

1. A process for preparing 2,3-dihydro-1H-1,4-benzodiazepine derivatives, represented by the formula,

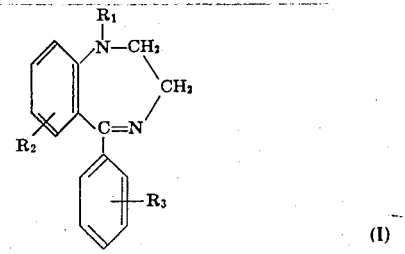

(I)

wherein $R_1$ signifies a hydrogen atom, a lower alkyl group having up to 4 carbon atoms or a cyloalkyl-methyl group having 4 – 7 carbon atoms; $R_2$ signifies a hydrogen atom, a halogen atom, a nitro group, a lower alkoxy group having up to 4 carbon atoms or a trifluoromethyl group; and $R_3$ signifies a hydrogen atom, a halogen atom, a lower alkyl group having up to 4 carbon atoms, a lower alkoxy group having up to 4 carbon atoms or a trifluoromethyl group, comprising treating a diphenylmethyleneimine derivative represented by the formula,

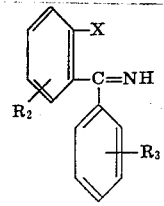
(II)

wherein $R_2$ and $R_3$ are as defined above, and X signifies a halogen atom, with an ethylenediamine derivative represented by the formula,

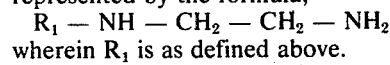 (III)

wherein $R_1$ is as defined above.

2. A process according to claim 1, wherein the reaction is carried out in the presence of an acid binding agent.

3. A process according to claim 1, wherein the reaction is carried out in the presence of a catalyst from copper powder or a copper acetate.

4. A process according to claim 1, wherein the reaction is carried out in the presence of an acid binding agent and a catalyst from copper powder or a copper acetate.

5. A process according to claim 2, wherein the acid binding agent is an alkali metal hydroxide, an alkali metal carbonate or a tertiary amine.

6. A process according to claim 1, wherein the reaction is carried out in the presence of a solvent.

7. A process according to claim 1, wherein the reaction is carried out in the presence of a solvent and at a temperature of room temperature to boiling point of the solvent.

8. A process according to claim 6, wherein the solvent is nitrobenzene, dimethylformamide, dimethylsulfoxide, pyridine, picoline or quinoline.

9. A process according to claim 4, wherein the acid binding agent is an alkali metal hydroxide, an alkali metal carbonate or a tertiary amine.

10. A process according to claim 7, wherein the solvent is nitrobenzene, dimethylformamide, dimethylsulfoxide, pyridine, picoline or quinoline.

11. The process of claim 2 wherein the acid binding agent is selected from the group consisting of anhydrous potassium carbonate, anhydrous sodium acetate, pyridine, and N-ethyl morpholine.

* * * * *